2,357,052

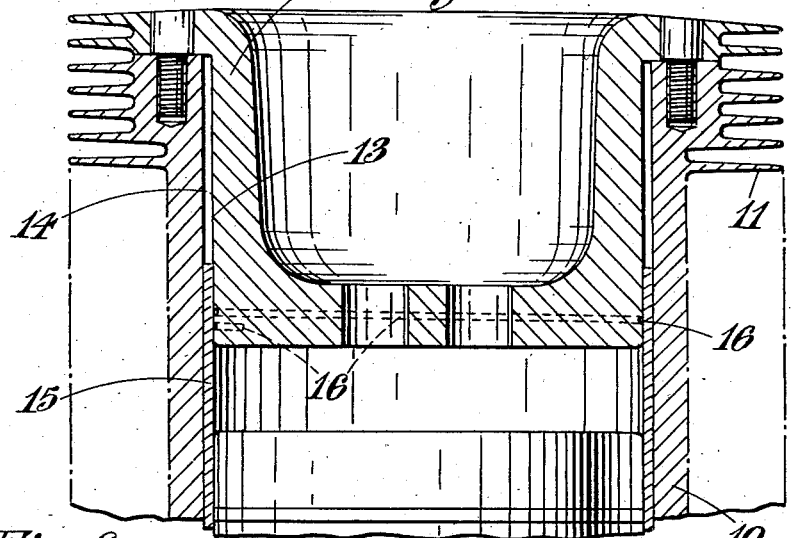
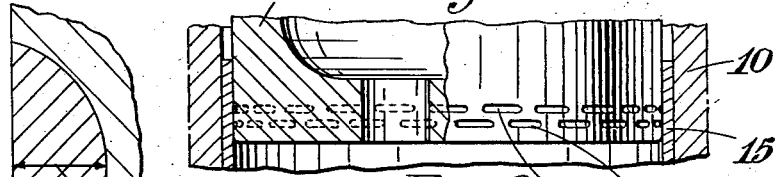
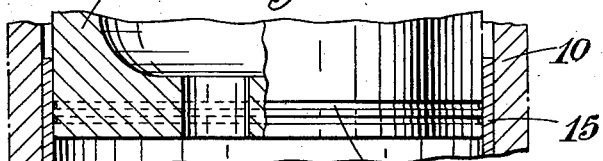
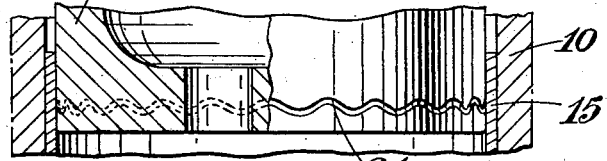
Inventor
Harvey C. Mansell
by Wilkinson & Mawhinney
Attorneys Patented Aug. 29, 1944

UNITED STATES PATENT OFFICE 2,357,052

SLEEVE-VALVE INTERNAL-COMBUSTION ENGINE

Harvey Charles Mansell, Bristol, England

Application December 15, 1942, Serial No. 469,078
In Great Britain December 2, 1941

7 Claims. (Cl. 123—75)

This invention concerns improvements in or relating to internal-combustion engines of the kind wherein the inlet and exhaust ports of each cylinder are controlled by a reciprocating and/or rotating sleeve disposed within the cylinder, and the cylinder-head thereof is formed with a re-entrant portion which depends within the cylinder.

Under certain operating conditions of the engine the sleeve (which slides in the space between the re-entrant portion of the head and the cylinder wall) has seized upon the re-entrant portion of the head, and it is the object of the present invention to eliminate this.

According to the present invention, one of the mating faces of the cylinder-head and sleeve-valve combination is formed with one or more indentations on or around the circumference of said face. According to another feature of this invention, one of the said mating faces may be coated with a ductile bearing-metal having a melting point within the range 225° C. to 350° C. According to yet another feature of this invention, the ductile bearing-metal may be applied only to the indentation or indentations, with the remainder of the mating faces clear of the said bearing-metal.

According to yet another feature of this invention, the indentation or indentations are of small depth, of the order of 0.005 of an inch.

In the acompanying drawing, which is more or less diagrammatic,

Figure 1 is a central sectional view showing part of an air-cooled cylinder for an internal-combustion engine, to which the invention is applied, Figures 2 to 5 are scrap views showing various forms of indentation which may be used, and Figure 6 is a scrap view to a much larger scale showing a preferred shaping of the indentations.

Referring first to Figure 1, the reference 10 indicates a portion of a cylinder of aluminium or other light alloy, for an internal-combustion engine; it is provided with cooling fins 11, and with a re-entrant head 12 of which the circumferential face 13 is spaced away from the internal bore of the cylinder 10 to provide an annular space 14. A steel sleeve-valve 15 is reciprocable or may be reciprocable and rotatable in the cylinder to control the inlet and exhaust ports thereof, and in its movement this sleeve enters the space 14 so that its inner face engages with the circumferential face of the cylinder-head 12. These are the faces which, as mentioned above, are liable in some operating conditions to seize upon one another.

According to one form of this invention, there is formed on the circumferential wall of the cylinder-head 12 near the end which lies within the cylinder, a helical groove 16 having at least one complete turn, and if desired, more than one complete turn. In Figure 6 there is shown to a much larger scale the proportions of this groove; the depth 17 is conveniently from 0.004 to 0.008 of an inch, the width about 0.010 of an inch and the pitch about 0.025 of an inch or slightly more.

In the modification illustrated in Figure 2, the indentations are in the form of a series of short notches or grooves 18, which are of similar dimensions to the groove of Figure 1, and these notches may be arranged in a line around the junk-head. If desired, two or more such lines may be provided as indicated at 18 and 19.

In the modification illustrated in Figure 3, a continuous groove 20 similar to that illustrated in Figure 1, may be used but instead of being of spiral formation, it is formed as a complete circumferential groove, and more than one of such grooves may be provided.

In the modification illustrated in Figure 4, a single groove 21 is provided extending completely around the periphery of the head 12, but instead of being a straight groove it is a sinuous form.

In the various embodiments of the invention so far described, the indentations are all formed on the re-entrant cylinder-head 12 near the inner end thereof, but Figure 5 illustrates yet another form of the invention in which the indentations are formed on the inner face of the sleeve 15. These are illustrated as two parallel grooves 22, similar to the grooves 20 of Figure 3, but it will be understood that any of the other forms of indentation may be used on the sleeve instead of on the cylinder-head.

It has been found that the provision of indentations on one of the mating faces of the cylinder-head and sleeve is very effective in diminishing or obviating the risk of seizure of these two parts in operation, and although they have been described as being provided adjacent the inner end of the cylinder-head, they may be formed on any part of the surfaces which sweep over one another, or may be distributed over the whole of such surfaces.

In a modification of the invention, a ductile bearing-metal having a low melting point may be used as a filling for the indentations, as shown in the upper part of Figure 6.

This bearing-metal is conveniently applied in the following manner. Prior to completing the machining operation of the surface of the cylinder-head or sleeve which is to receive the indentations, they are formed upon it; a film of the bearing-metal is then electro-deposited all over the surface, so that it fills the indentations, and the part is then machined to its final dimensions. This operation removes the film of bearing-metal from the surface but leaves the indentations filled with it.

It has been found in practice that cadmium which has a melting point of 320° C. is highly ductile and is a satisfactory metal to use, but lead with a melting point of 327° C., or tin with a melting point of 232° C., may also be used. Alloys of these metals having appropriate physical characteristics of ductility and melting point may also be used.

I claim:

1. In a sleeve-valve internal-combustion engine, the combination of a cylinder-body, a re-entrant cylinder-head secured thereon and providing an annular space between said head and said cylinder-body, a sleeve-valve movable in said annular space with its inner surface engaging said cylinder-head, one of said engaging faces being formed with a plurality of short grooves of the order of 0.005 inch in depth and of small area compared with that of the engaging faces disposed in a linear arrangement around the circumference.

2. In a sleeve-valve internal-combustion engine, the combination of a cylinder-body, a re-entrant cylinder-head secured thereon and providing an annular space between said head and said cylinder-body, a sleeve-valve movable in said annular space with its inner surface engaging said cylinder-head, one of said engaging faces being formed with a plurality of short grooves of the order of 0.005 inch in depth and of small area compared with that of the engaging faces spaced apart in a plurality of lines extending around the circumference.

3. In a sleeve-valve internal-combustion engine, the combination of a cylinder-body, a re-entrant cylinder-head secured thereon and providing an annular space between said head and said cylinder-body, a sleeve-valve movable in said annular space with its inner surface engaging said cylinder-head, one of said engaging faces being formed with shallow indentations of the order of 0.005 inch in depth and of small area compared with that of the engaging faces and a filling of cadmium deposited in said indentations.

4. In a sleeve-valve internal-combustion engine, the combination of a cylinder-body, a re-entrant cylinder-head secured thereon and providing an annular space between said head and said cylinder-body, a sleeve-valve movable in said annular space with its inner surface engaging said cylinder-head, one of said engaging faces being formed with shallow indentations of the order of 0.005 inch in depth and of small area compared with that of the engaging faces and a filling in said indentations of a ductile bearing-metal having a melting point between 225° C. and 350° C., such as tin or lead or an alloy thereof.

5. In a sleeve-valve internal combustion engine, the combination of a cylinder body, a re-entrant cylinder-head secured thereon and providing an annular space between said head and said cylinder-body, a sleeve-valve movable in said annular space with its inner surface engaging said cylinder-head, one of said engaging faces being formed with indentations of the order of 0.005 inch in depth disposed in a linear arrangement around the circumference, said indentations being of a small area compared with that of the engaging faces.

6. The construction set forth in claim 5, and a filling in said indentations of a ductile bearing metal of low melting point.

7. The construction set forth in claim 5 in which said indentations take the form of a shallow spiral groove of not less than one turn and a filling of a ductile bearing metal of low melting point in said groove.

HARVEY CHARLES MANSELL.